United States Patent
Sectish

[11] Patent Number: 5,590,621
[45] Date of Patent: Jan. 7, 1997

[54] FUNERAL PROCESSION MOTORCADE SAFETY FLAG ASSEMBLY

[76] Inventor: Michael G. Sectish, 769 11th Ave., Paterson, N.J. 07514

[21] Appl. No.: 514,840

[22] Filed: Aug. 14, 1995

[51] Int. Cl.⁶ .................................................. G09F 17/00
[52] U.S. Cl. ........................ 116/173; 116/28 R; 40/591; 24/545; 403/256
[58] Field of Search ................................. 116/28 R, 173; 24/562, 563, 545; 403/256, 247, 291; 40/591

[56] References Cited

U.S. PATENT DOCUMENTS

| | | | |
|---|---|---|---|
| 2,631,359 | 3/1953 | Schwartz | 24/562 |
| 2,976,593 | 3/1961 | Exton | 24/562 |
| 3,075,492 | 1/1963 | Winfrey | 116/28 R |
| 3,127,868 | 4/1964 | Guthrie | 116/173 |
| 3,280,790 | 10/1966 | Booth | 116/28 R |
| 3,636,912 | 1/1972 | Kamp | 116/28 R |
| 3,887,900 | 6/1975 | Goedert | 116/56 |
| 4,079,765 | 3/1978 | Hatayan | 24/545 |
| 4,875,431 | 10/1989 | Dobosz | 116/28 R |
| 4,884,524 | 12/1989 | Minotti | 116/28 R |
| 4,964,360 | 10/1990 | Henry | 116/28 R |
| 5,016,559 | 5/1991 | Larson et al. | 24/562 |
| 5,473,796 | 12/1995 | Fusillo | 24/545 |
| 5,517,941 | 5/1996 | Fisher | 116/28 R |

Primary Examiner—William A. Cuchlinski, Jr.
Assistant Examiner—Andrew Hirshfeld
Attorney, Agent, or Firm—Alfred C. Hill

[57] ABSTRACT

A funeral procession motorcade safety flag assembly including a flag containing predetermined wording thereon to identify a motor vehicle in the motorcade as being in a funeral procession and to alert drivers of other motor vehicles using the same road of this fact; and a member fastened to a predetermined edge of the flag to enable properly displaying the predetermined wording and to detachably secure the flag to an existing radio antenna of the motor vehicle in the motorcade.

16 Claims, 2 Drawing Sheets

FUNERAL PROCESSION MOTORCADE SAFETY FLAG ASSEMBLY

BACKGROUND OF THE INVENTION

The present invention relates to a flag for vehicles, and more particularly to a new improved flag which can be temporarily attached to a motor vehicle existing radio antenna to identify the motor vehicle as being part of a funeral procession motorcade.

In the past, a funeral service was held at a church or synagogue and a foot march was made to the nearby grave site to pay respect, honor and bury the deceased.

In today's world the funeral march to a grave site is no longer a private event, but a motorcade consisting of a hearse, flower cars and a long line of cars traveling on city streets, major roadways and interstate highways, hereinafter referred as to just roads, thereby involving the public including other motorists.

Funeral procession motorcades encounter problems in maintaining the link between the cars in the procession to the lead funeral coach because there is no convenient way to signal other motorists on the roadway and make them aware that a funeral procession is in progress other than having headlights on each of the motor vehicles in the procession. However, on today's highways a lot of drivers of motor vehicles keep their headlights on at all times so that they are more visible to other motorists. This could complicate maintaining the link to the lead funeral coach because other motorists would think that the motor vehicles with their headlights on are mearly those drivers that have their headlights on all the time for visibility.

A funeral procession motorcade can consist of as many as 50 cars traveling, at times, great distances on main roads to the grave site and a disruption of the procession causes great distress to the grieving family of the deceased and to the mourning friends.

There is a definite need for a dignified procession motorcade safety flag especially designed to befit the occasion. However, such a flag must have the following features:

(1) The flag must be easily and readily attached to any make or model of motor vehicle to display the flag in a conspicuous manner on the motor vehicle.

(2) The flag must be readily detachable from the motor vehicle.

(3) The flag must not mar or otherwise damage the surface of the vehicle to which it is attached.

(4) The flag must provide for easily and quickly removing and replacing flags to facilitate cleaning or replacement of the flags.

(5) The flag must remain securely attached to the motor vehicle at speeds and wind velocities of 50 to 60 miles an hour.

(6) The flag must be inexpensive to manufacture as well as attractive in appearance.

U.S. Pat. No. 2,534,117 discloses a flag and a particular mast therefore which is clamped between the door and the door frame of the motor vehicle. U.S. Pat. Nos. 3,239,957; 3,715,821; 3,738,039; 3,762,360; 4,002,138 and 4,375,134 disclose a flag with its supporting mast which is clamped either in the main window of the motor vehicle or a window vent of the motor vehicle. U.S. Pat. No. 2,764,122 describes a funeral flag with an associated mast which is secured to the rain gutter of the motor vehicle. U.S. Pat. Nos. 3,148,856; 3,241,516; and 4,574,726 disclose flags and their associated masts which are magnetically and/or suction cup fastened to the motor vehicle.

SUMMARY OF THE INVENTION

An object of the present invention is to provide an improved funeral procession motorcade safety flag assembly.

Another object of the present invention is to provide a funeral procession motorcade safety flag which has wording thereon to signal and alert other motorists that a funeral motorcade is in progress and by the wording on the flag to appeal to other motorists to honor and respect the motorcade in the interest of motoring safety so as to assure that unintentional disruption or detachment from the lead funeral coach does not cause distress to the grieving family and mourning friends and any other unnecessary inconvenience to the motoring public at large.

A further object of the present invention is to provide a funeral procession motorcade safety flag that would find immediate acceptance by the people of all religious faiths and be enthusiastically received by funeral directors and other professionals in the funeral home business.

Still another object of the present invention is to provide a funeral procession motorcade safety flag that is specifically designed to befit the occasion with the design of the flag having wording thereon to convey the solemnity of the event.

A feature of the present invention is the provision of a funeral procession motorcade safety flag assembly comprising a flag containing predetermined wording thereon to identify a motor vehicle in the motorcade as being in the funeral procession and to alert drivers of other motor vehicles using the same road of this fact; and means fastened to a predetermined edge of the flag to enable properly displaying the predetermined wording and to detachably secure the flag to an existing radio antenna of the motor vehicle in the motorcade.

Another feature of the present invention is the provision of a funeral procession motorcade safety flag assembly where the flag as mentioned hereinabove includes a purple fabric, a gold border on all edges of the purple fabric except the predetermined edge, and white letters spelling out the predetermined wording disposed on the purple fabric.

BRIEF DESCRIPTION OF THE DRAWING

Above-mentioned and other features and objects of the present invention will become more apparent by reference to the following description taken in conjunction with the accompanying drawing, in which.

DESCRIPTION OF THE PREFERRED EMBODIMENTS

Figure 1:
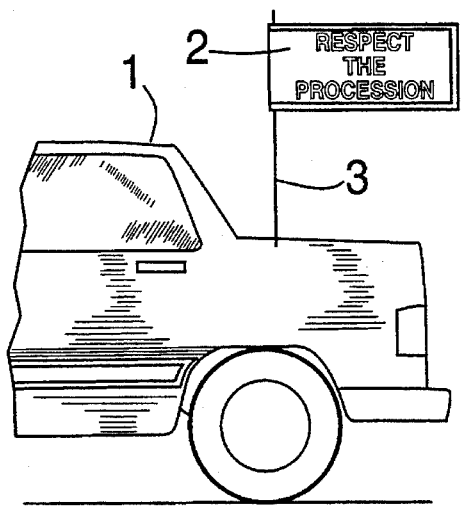
FIG. 1 is a side view of the rear of a motor vehicle incorporating the safety flag assembly in accordance with the principles of the present invention.

Referring to FIG. 1, there is illustrated therein a side view of the rear of a motor vehicle 1 incorporating therein a safety flag 2 in accordance with the principles of the present invention secured to the existing radio antenna 3 of motor vehicle 1.

Figure 2:
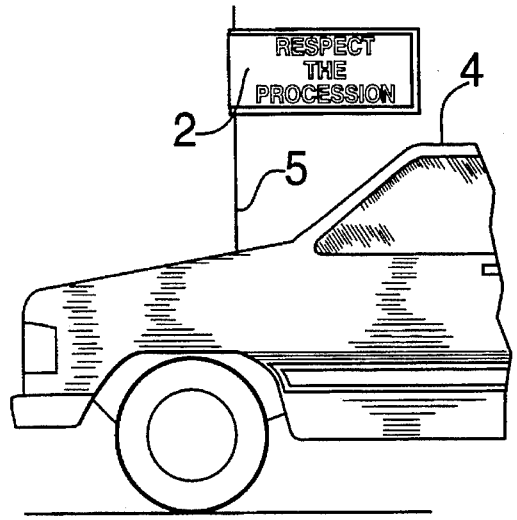
FIG. 2 is a side view of the front of a motor vehicle incorporating the signal flag assembly in accordance with the principles of the present invention.

Referring to FIG. 2, there is illustrated therein a side view of the front of the motor vehicle 4 incorporating safety flag 2 secured to the existing radio antenna 5 of motor vehicle 4.

Figure 3:
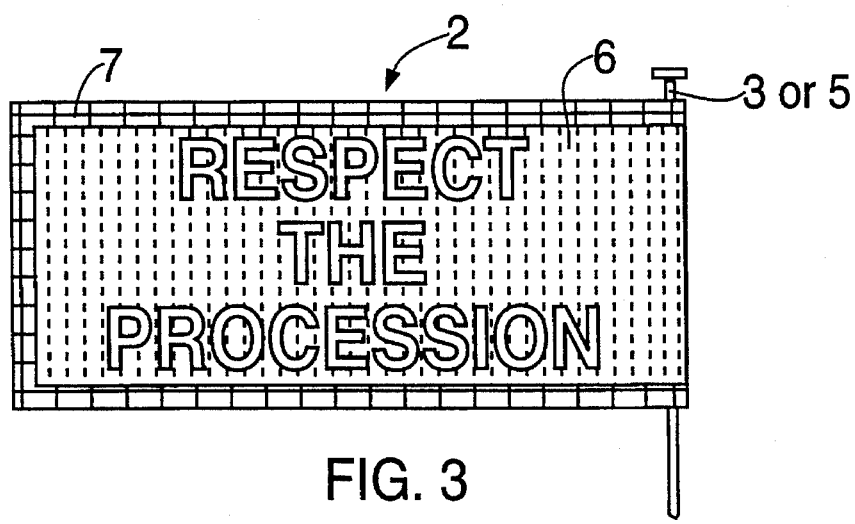
FIG. 3 is a side view of the signal flag in accordance with the principles of the present invention incorporating thereon one embodiment of the wording that could be employed thereon.
Figure 4:
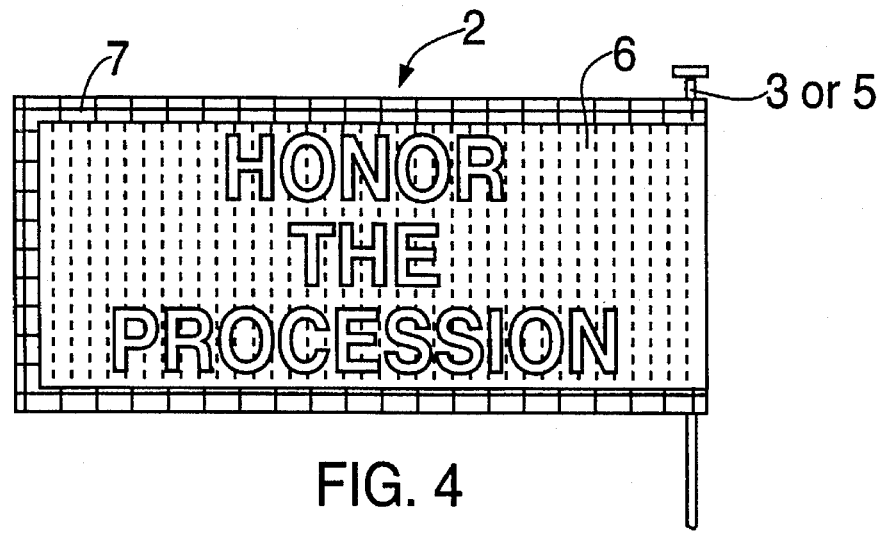
FIG. 4 is a side view of the signal flag in accordance with the principles of the present invention incorporating thereon a second embodiment of the wording that could be employed.

As illustrated in FIGS. 3 and 4, the safety flag 2, in accordance with the principles of the present invention, may have either of two different type of wording thereon, but otherwise have basically the same type of construction. As shown in FIGS. 3 and 4, the safety flag 2 contains predetermined wording thereon which in the instance of FIG. 3 is RESPECT THE PROCESSION and in FIG. 4 HONOR THE PROCESSION. The lettering forming these words are white and are disposed by silk screening, or other methods, upon a fabric 6 having a purple color with a gold border 7 on all edges except the edge secured to an arrangement to fasten the flag to the existing antenna 3 or 5. The wording on the safety flag 2 is unlike any other in that the wording seeks to enlist and instruct other motorists in a very polite way to respond with courtesy and thoughtfulness during the solemn event to ensure the safety of all motorists.

Figure 5:
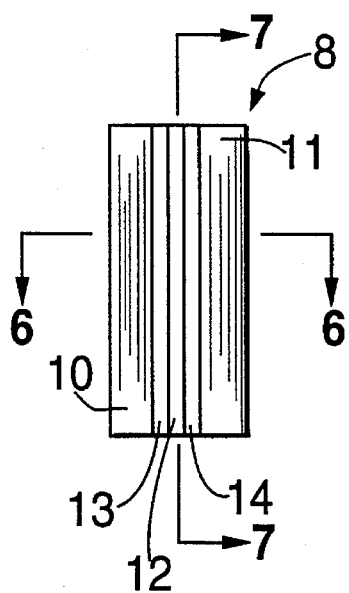
FIG. 5 is an elevational view of the snap-on holder to fasten the safety flag to the existing antenna of a motor vehicle with the antenna 3 or 5 removed and the flag fabric removed in accordance with the principles of the present invention.

As shown in FIG. 5, the safety flag 2 is secured to an existing radio antenna 3 or 5 by a easy-on and easy-off snap-on holder 8. The material 6 may be fastened to the plastic holder 8 by a suitable adhesive, or other bonding material. With this attachment to the existing antenna 3 or 5, the safety flag 2 will not mar or damage any part of the motor vehicle during its use, or become detached during high speed or strong wind velocity, since high speed and wind velocity would force the plastic member 8 strongly against the antenna 3 or 5 and thereby prevent the detachment during such high speed or strong wind velocity.

Figure 6:
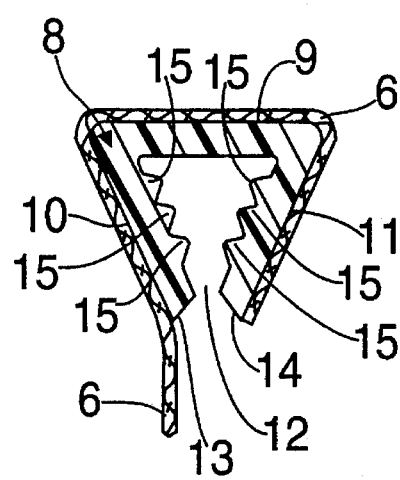
FIG. 6 is a cross-sectional view taken along line 6—6 of FIG. 5 with the safety flag fabric illustrated in the cross-section.
Figure 7:
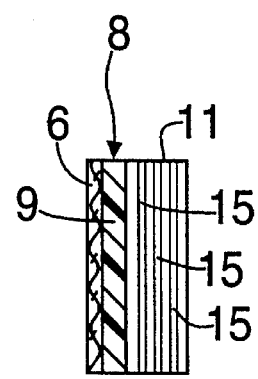
FIG. 7 is a cross-sectional view taken along line 7—7 of FIG. 5 with the safety flag fabric illustrated in cross section.

As illustrated in FIGS. 6 and 7, the holder 8, which preferably is made of plastic, has a back portion 9 and two side portions 10 and 11. Side portions 10 and 11 extend from a different end of back portion 9 and taper inwardly toward each other to form a narrow opening 12 which provides tension in the holder 8 to grip antenna 3 or 5 when the holder 8 is caused to engage antenna 3 or 5. As will be noted more clearly in FIG. 6, the side portions 10 and 11 have outwardly extending portions 13 and 14 adjacent narrow opening 12 to assist in engaging antenna 3 or 5.

As best seen in FIGS. 6 and 7, each of the side portions 10 and 11 have a plurality of ribs 15 which assist in the holder 8 being able to strongly grip antenna 3 or 5. These ribs 15 are on the internal side surface of the holder 8. Attached to the entire external side surface of the holder 8 is a portion of the material 6, which is attached to the holder 8 to cover the entire holder 8 except for the top and bottom surfaces of the holder 8 and the internal side surface of the holder 8.

At the present time, funeral procession motorcades encounter many problems trying to maintain the link to the lead coach, and at times cause accidents in the attempt, because there is no way to signal or caution other motorists other than having their headlights on.

Since most car drivers do not know the exact location of the cemetery, or the route the lead hearse will travel to the cemetery, it is essential that every effort be made to help them maintain constant contact with the hearse to assure that the motorcade arrives intact, even during high speed.

At the time of assembly and positioning of the motor vehicles, the funeral director staff will attach the safety flag 2 of the present invention to the existing radio antenna 3 or 5 of every car including the hearse and flower cars, advising those drivers of cars with a retractable type antenna, to turn the radio ON to thereby raise the antenna with the suggestion that the audio be muted by turning down the volume. Upon arriving at the cemetery, the funeral director staff would remove the flags so that these flags can be reused in future funeral processions.

As mentioned above the holder 8 can be a plastic with one type of such plastic being an extruded polystyrene plastic.

A preferred embodiment of safety flag 2 would have dimensions as follows:

Material 6 and border 7 - 6" by 10"

Holder 8 - 5/16" by 5/8" by 6" O.D.

The lettering of this preferred embodiment would be Franklin Gothic or Helvetica Med.

While I have described above the principles of my invention in connection with specific apparatus, it is to be clearly understood that this description is made only by way of example and not as a limitation to the scope of my invention as set forth in the objects thereof and in the accompanying claims.

I claim:

1. A funeral procession motorcade safety flag assembly comprising:

a fabric flag having a predetermined phrase thereon, said predetermined phrase identifying a motor vehicle in a motorcade as being in a funeral procession and requesting motorists not in said motorcade to not interfere with, or break into, said motorcade; and an easy-on and easy-off snap-on holder having a length coextensive with the length of a predetermined edge of said fabric flag, said fabric flag having a portion adjacent said predetermined edge, said portion being bonded to said snap-on holder over the entire length of said fabric flag to detachably secure said fabric flag to an existing radio antenna of said motor vehicle in said motorcade and to properly display said predetermined phrase, said snap-on holder having a top surface, a bottom surface, an internal side surface, an external side surface, and a narrow opening extending from the external side surface to the internal side surface for permitting the antenna to be received therethrough, said internal side surface for securing said antenna therein, and said external side surface for engaging said fabric flag, said portion of said fabric flag completely covering said snap-on holder except for the top surface, the bottom surface, and the internal side surface, wherein when said snap-on holder is secured to said antenna, said snap-on holder completely covers said antenna the entire length of said snap-on holder except for at the narrow opening.

2. A safety flag assembly according to claim 1, wherein said flag is purple and includes, a gold border on all edges of said purple fabric except said predetermined edge, and white letters spelling out said predetermined phrase on said purple fabric.

3. A safety flag assembly according to claim 2, wherein said purple fabric is a rectangle having two long edges and two short edges, and said predetermined edge to which said snap-on holder is bonded is one of said two short edges.

4. A safety flag assembly according to claim 3, wherein said snap-on holder includes a flexible back portion, and a pair of side portions each extending from a different end of said back portion and tapering inwardly toward each other to form said narrow opening, said side portions providing tension in said snap-on holder to grip and enclose said antenna when said snap-on holder is caused to engage said antenna.

5. A safety flag assembly according to claim 4, wherein each of said side portions includes an outwardly extending portion adjacent said narrow opening to assist in engaging said antenna.

6. A safety flag assembly according to claim 5, wherein each of said portions further includes a plurality of ribs extending the entire length of said snap-on holder to assist said snap-on holder in gripping said antenna.

7. A safety flag assembly according to claim 1, wherein said snap-on holder includes a flexible back portion, and a pair of side portions each extending from a different end of said back portion and tapering inwardly toward each other to form said narrow opening, said side portions provide tension in said snap-on holder to grip and enclose said antenna when said snap-on holder is caused to engage said antenna.

8. A safety flag assembly according to claim 7, wherein each of said side portions includes an outwardly extending portion adjacent said narrow opening to assist in engaging said antenna.

9. A safety flag assembly according to claim 7, wherein each of said side portions further includes a plurality of ribs extending the entire length of said snap-on holder to assist said snap-on holder in gripping said antenna.

10. A safety flag assembly according to claim 1, wherein said predetermined phrase is a phrase selected from the group consisting of HONOR THE PROCESSION and RESPECT THE PROCESSION.

11. A safety flag assembly according to claim 10, wherein said flag is purple and includes, a gold border on all edges of said purple fabric except said predetermined edge, and white letters diposed on said purple fabric spelling out said selected one of HONOR THE PROCESSION and RESPECT THE PROCESSION.

12. A safety flag assembly according to claim 11, wherein said snap-on holder includes a flexible back portion, and a pair of side portions each extending from a different end of said back portion and tapering inwardly toward each other to form said narrow opening, said side portions provide tension in said snap-on holder to grip and enclose said antenna when said snap-on holder is caused to engage said antenna.

13. A safety flag assembly according to claim 12, wherein each of said side portions includes an outwardly extending portion adjacent said narrow opening to assist in engaging said antenna.

14. A safety flag assembly according to claim 13, wherein each of said side portions further includes a plurality of ribs extending the entire length of said snap-on holder to assist said snap-on holder in gripping said antenna.

15. A safety flag assembly according to claim 14, wherein said snap-on holder is an extruded polystyrene plastic snap-on holder.

16. A safety flag assembly according to claim 1, wherein said snap-on holder is an extruded polystyrene plastic snap-on holder.

\* \* \* \* \*